United States Patent
Zhang et al.

(10) Patent No.: US 9,258,862 B2
(45) Date of Patent: Feb. 9, 2016

(54) LED BACKLIGHT DRIVING CIRCUIT, LCD DEVICE, AND METHOD FOR DRIVING THE LED BACKLIGHT DRIVING CIRCUIT

(71) Applicant: SHENZHEN CHINA STAR OPTOELECTRONICS TECHNOLOGY CO., LTD, Shenzhen (CN)

(72) Inventors: Xianming Zhang, Shenzhen (CN); Xiang Yang, Shenzhen (CN)

( * ) Notice: Subject to any disclaimer, the term of this patent is extended or adjusted under 35 U.S.C. 154(b) by 152 days.

(21) Appl. No.: 14/006,676

(22) PCT Filed: Jun. 28, 2013

(86) PCT No.: PCT/CN2013/078293
§ 371 (c)(1),
(2) Date: Sep. 22, 2013

(87) PCT Pub. No.: WO2014/180054
PCT Pub. Date: Nov. 13, 2014

(65) Prior Publication Data
US 2014/0333204 A1  Nov. 13, 2014

(30) Foreign Application Priority Data
May 8, 2013  (CN) .......................... 2013 1 0167121

(51) Int. Cl.
*H05B 33/08* (2006.01)
*G09G 3/00* (2006.01)

(52) U.S. Cl.
CPC .............. *H05B 33/0827* (2013.01); *G09G 3/00* (2013.01); *Y02B 20/341* (2013.01)

(58) Field of Classification Search
CPC ...... H05B 37/02; H05B 33/08; H05B 33/083; H05B 33/0884; H05B 33/0827; H05B 33/051
USPC ...... 315/122, 185 R, 186, 291, 294, 307, 308
See application file for complete search history.

(56) References Cited

U.S. PATENT DOCUMENTS

| | | | |
|---|---|---|---|
| 8,664,890 B2 * | 3/2014 | Hsieh et al. | 315/294 |
| 2011/0157246 A1 * | 6/2011 | Jang | G09G 3/3406 345/690 |
| 2011/0204817 A1 * | 8/2011 | Han | 315/294 |
| 2013/0114016 A1 * | 5/2013 | Lim et al. | 349/43 |
| 2013/0285571 A1 * | 10/2013 | Li et al. | 315/297 |

FOREIGN PATENT DOCUMENTS

| | | | |
|---|---|---|---|
| CN | 101527120 A | | 9/2009 |
| CN | 102110401 A | | 6/2011 |
| CN | 102110418 A | | 6/2011 |
| CN | 102123536 A | | 7/2011 |
| CN | 102446492 A | | 5/2012 |
| CN | 202488822 U | * | 10/2012 |
| CN | 103021343 A | | 4/2013 |
| JP | 2008130377 A | | 6/2008 |
| KR | 20110129644 A | | 12/2011 |
| TW | 201215219 A1 | | 4/2012 |

OTHER PUBLICATIONS

Liu Xue, the International Searching Authority written comments, Feb. 2014, CN.

* cited by examiner

*Primary Examiner* — Douglas W Owens
*Assistant Examiner* — Thai Pham

(57) ABSTRACT

A light emitting diode (LED) backlight driving circuit includes an LED light bar, a power supply that drives the LED light bar to light, a short-circuit protection unit, and a divider resistor. An output end of the LED light bar is coupled to the short-circuit protection unit and the divider resistor. The short-circuit protection unit includes a comparing unit and a driving unit coupled to the comparing unit. Voltage of two ends of the divider resistor is regarded as a feedback voltage, and the feedback voltage and a first reference voltage are input to the comparing unit. When a difference value of the first reference voltage subtracted from the feedback voltage is greater than a preset deviation value, the driving unit controls the power supply to turn off. When brightness of one normal LED light bars reaches a maximum, the first reference voltage is greater than or equal to voltage of two ends of the divider resistor corresponding to the one normal LED light bar.

15 Claims, 3 Drawing Sheets

US 9,258,862 B2

LED BACKLIGHT DRIVING CIRCUIT, LCD DEVICE, AND METHOD FOR DRIVING THE LED BACKLIGHT DRIVING CIRCUIT

TECHNICAL FIELD

The present disclosure relates to the field of liquid crystal displays (LCDs), and more particularly to a light emitting diode (LED) backlight driving circuit, an LCD device, and a method for driving the LED backlight diving circuit.

BACKGROUND

A liquid crystal display (LCD) device includes a liquid circuit (LC) panel and a backlight unit. A typical backlight unit includes a plurality of light emitting diode (LED) light bars and a driving circuit of the LED light bars. Due to different LED light bars having different voltages, a voltage difference is generated between the different LED light bars, and the voltage difference is input to a constant current driving chip or other components, which increases temperature of the constant current driving chip and other components. One method is used to solve the above-mentioned problem: changing a duty cycle and current value of the each of the LED light bars, and maintaining an average current and voltage of each of the LED light bars to be same. For example, if voltage of one LED light bar is very low, the voltage of the one LED light bar can be increased by correspondingly increasing a current value of the one LED light bar, and simultaneously reducing a pulse-width modulation (PWM), and the voltage difference is reduced by adjusting the dirt cycle of the each of the LED light bars, and the power is kept constant.

However, when one or more LED lamps of the LED light has short-circuits, the above-mentioned method cannot determine whether the LED light bar short-circuits, thus, which is not able to provide effective short-circuit protection of the LED light bar.

SUMMARY

The aim of the present disclosure is to provide a light emitting diode (LED) backlight driving circuit, a liquid crystal display (LCD) device, and a method for driving the LED backlight driving circuit, which provide a short-circuit protection when any one of LED lamps of the LED light bar short-circuits.

The aim of the present disclosure is achieved by the following method.

The LED backlight driving circuit comprises an LED light bar, a power supply that drives the LED light bar to light a short-circuit protection unit, and a divider resistor. An output end of the LED light bars is coupled to the short-circuit protection unit and the divider resistor. The short-circuit protection unit comprises a comparing unit and a driving unit coupled to the comparing unit. Voltage of two ends of the divider resistor is regarded as a feedback voltage, and the feedback voltage and a first reference voltage are input to the comparing unit. When a difference value of the first reference voltage subtracted from the feedback voltage is greater than a preset deviation value, the driving unit controls the power supply to turn off. When brightness of one normal LED light bars reaches a maximum, the first reference voltage is greater than or equal to voltage of two ends of the divider resistor corresponding to the one normal LED light bar.

The preset deviation value is a range of the difference value that the feedback voltage exceeds the first reference voltage, which is determined according to different types of devices or program adjusting method. For example, the preset deviation value may be 1V, 2V, 3V, or 5V, and when the difference value of the first reference voltage subtracted from the feedback voltage exceeds the preset deviation value (1V, 2V, 3V or 5V), the driving unit controls the power supply to turn off. The preset deviation value also may be zero, namely when the feedback voltage is greater than the first reference voltage, the diving unit controls the power supply to turn off.

Furthermore, the comparing unit comprises a subtractor, where a first input end of the subtractor receives the feedback voltage, and a second input end of the subtractor receives the first reference voltage. The difference value of the first reference voltage subtracted from the feedback voltage can be directly output by the subtractor, thus, the driving unit only is used for determining whether the difference value exceeds the preset deviation value, if the difference value exceeds the preset deviation value, the power supply turns off.

Furthermore, the driving unit comprises a comparator, where a first input end of the comparator is coupled to an output end of the subtractor. A second input end of the comparator receives a second reference voltage. The second reference voltage is equal to the preset deviation value. When an output voltage of the subtractor is greater than the second reference voltage, the comparator controls the power supply to turn off. This is a special circuit of the driving unit. The present disclosure determines whether the difference value is greater than the present deviation value by the comparator U2 coupled to the subtractor U1, where the difference value is obtained by subtracting the first reference voltage VF1 from the feedback voltage. Additionally, output of the comparator allows the comparator U2 to have good driving capability, which is completely able to drive the short-circuit protection when the LED lamps of the LED light bars short-circuit. Circuit structure is simple and component costs are low, which reduces design and production costs.

Furthermore, the comparator unit comprises a first controllable switch, a first resistor, a second resistor, and a third resistor. A source electrode of the first controllable switch receives a reference high level signal through the first resistor. A drain electrode of the first controllable switch is connected with the ground terminal of the LED backlight driving circuit through the second resistor. A gate electrode of the first controllable switch receives the feedback voltage through the third resistor. The drain electrode of the first controllable switch receives the first reference voltage, and the source electrode of the first controllable switch is coupled to an inverter, where an output end of the inverter is coupled to the driving unit. When the first controllable switch turns on, an output voltage of the inverter inverts, which controls the driving unit to drive the power supply to turn off.

A metal-oxide-semiconductor field-effect transistor (MOSFET) or a bipolar junction transistor (BJT) is used as the controllable switch, and the controllable switch is turned on when a value of voltage of the drain electrode of the controllable switch subtracted from voltage of the gate electrode of the controllable switch is greater than a threshold value, and the voltage of the gate electrode of the controllable switch reaches a desired value. Thus, condition turning on the first controllable switch itself limits the preset deviation value. When the difference value of the first reference voltage subtracted from the feedback voltage is greater than the preset deviation value, the first controllable switch turns on. When the first controllable switch turns off, the voltage of the source electrode of the first controllable switch is equal to voltage of the reference high level signal. After the first controllable switch turns on, the voltage of the source electrode of the first controllable switch reduces because the voltage is divided by the resistor. And the inverter is driven by changing the voltage of the source electrode of the first controllable switch. The present disclosure provides the preset deviation value through the conditions for turning on the controllable switch and the present disclosure controls the inverter by turning on/off the controllable switch, and further controls the driving unit. Circuit structure of the present disclosure is simple and component costs are low. Because of the inverter, the first reference voltage cannot be directly input to the diving unit, thereby avoiding incorrectly operation.

Furthermore, the inverter comprises a second controllable switch, a third controllable switch, a fourth resistor, and a fifth resistor. A source electrode of the second controllable switch receives the reference high level signal through the fourth resistor and is coupled to a gate electrode of the third controllable switch. A drain electrode of the second controllable switch is connected with the ground terminal of the LED backlight driving circuit, and the gate electrode of the second controllable switch is coupled to the source electrode of the first controllable switch. A source electrode of the third controllable switch receives the reference high level signal, and a drain electrode of the third controllable switch is connected with the ground terminal of the LED backlight driving circuit through the fifth resistor and is coupled to the driving unit.

This is a special structure of the inverter. When the source electrode of the first controllable switch outputs a high level voltage, the second controllable switch turns on, and voltage of the gate electrode of the third controllable switch reduces and the third controllable switch turns off, the drain electrode of the third controllable switch outputs a low level voltage. In the contrary, when the source electrode of the first controllable switch outputs the low level voltage, the third controllable switch turns off, and the drain electrode of the third controllable switch outputs the high level voltage. Thus, the output voltage of the inverter and the input voltage of the inverter are inverse logical relationship, and function of the inverter is achieved.

Furthermore, the driving unit comprises a sixth resistor, a fourth controllable switch that turns on at a low level, and a fifth controllable switch that turns on at a high level. A source electrode of the fourth controllable switch receives the reference high level signal through the sixth resistor. A drain electrode of the fourth controllable switch is coupled to the output end of the inverter and a gate electrode of the fifth controllable switch. A drain electrode of the fifth controllable switch is connected with the ground terminal of the LED backlight driving circuit and a source electrode of the fifth controllable switch is coupled to a gate electrode of the fourth controllable switch. The source electrode of the fourth controllable switch outputs a driving voltage to control the power supply to turn off.

The driving unit has a self-locking function. To be specific, the inverter controls the fifth controllable switch to turn on, voltage of the gate electrode of the fourth controllable switch correspondingly reduces, and the fourth controllable switch turns on, the reference high level signal is input to the gate electrode of the fifth controllable switch. Even if the driving signal of the inverter is cut off, the fifth controllable switch still turns on. When the fifth controllable switch and the fourth controllable switch turn of the voltage, of the source electrode of the fourth controllable switch is equal to the voltage of the reference high level signal. When the fifth controllable switch and the fourth controllable switch turn on, the voltage of the source electrode of the fourth controllable switch reduces, thus, the power supply turns off. The above-mentioned function allows the comparing unit to avoid incorrect operation because of voltage fluctuation, thereby improving reliability of protecting the LED light bar.

Furthermore, the inverter comprises a second controllable switch, a third controllable switch, a fourth resistor, and a fifth resistor. A source electrode of the second controllable switch receives the reference high level signal through the fourth resistor and is coupled to a gate electrode of the third controllable switch. A drain electrode of the second controllable switch is connected with the ground terminal of the LED backlight driving circuit. The gate electrode of the second controllable switch is coupled to the source electrode of the first controllable switch. A source electrode of the third controllable switch receives the reference high level signal, and a drain electrode of the third controllable switch is connected with the ground terminal of the LED backlight driving circuit through the fifth resistor. The driving unit comprises a sixth resistor, a fourth controllable switch that turns on at a low level, and a fifth controllable switch that turns on at a high level. A source electrode of the fourth controllable switch receives the reference high level signal through the sixth resistor; and a drain electrode of the fourth controllable switch is coupled to an output end of the inverter and a gate electrode of the fifth controllable switch. A drain electrode of the fifth controllable switch is connected with the ground terminal of the LED backlight driving circuit and a source electrode of the fifth controllable switch is coupled to a gate electrode of the fourth controllable switch. The source electrode of the fourth controllable switch outputs a driving voltage to control the power supply to turn off.

A metal-oxide-semiconductor field-effect transistor (MOSFET) or a bipolar junction transistor (BJT) is used as the controllable switch and the controllable switch is turned on when a value of voltage of the drain electrode of the controllable switch subtracted from voltage of the gate electrode of the controllable switch is greater than a threshold value, and the voltage of the gate electrode of the controllable switch reaches a desired value. Thus, condition for turning on the first controllable switch itself limits the preset deviation value. When the difference value of the first reference voltage subtracted from the feedback voltage is greater than the preset deviation value the first controllable switch turns on. When the first controllable switch turns off, the voltage of the source electrode of the first controllable switch is equal to voltage of the reference high level signal. After the first controllable switch turns on, the voltage of the source electrode of the first controllable switch reduces because the voltage is divided by the resistor. And the inverter is driven by changing the voltage of the source electrode of the first controllable switch. The present disclosure provides the preset deviation value through the conditions for turning on the controllable switch, and the present disclosure controls the inverter by turning on/off the controllable switch, and further controls the driving unit. Circuit structure of the present disclosure is simple and component costs are low. Because of the inverter, the first reference voltage cannot be directly input to the driving unit, thereby avoiding incorrectly operation.

When the source electrode of the first controllable switch outputs a high level voltage, the second controllable switch turns on, and voltage, of the gate electrode of the third controllable switch reduces, and the third controllable switch turns off, the drain electrode of the third controllable switch outputs a low level voltage. In the contrary, when the source electrode of the first controllable switch outputs the low level voltage, the third controllable switch turns off, and the drain electrode of the third controllable switch outputs the high level voltage. Thus, the output voltage of the inverter and the input voltage of the inverter are inverse logical relationship, and function of the inverter is achieved.

The driving unit has a self-locking function. To be specific, the inverter controls the fifth controllable switch to turn on voltage of the gate electrode of the fourth controllable switch correspondingly reduces, and the fourth controllable switch turns on, the reference high level signal is input the gate electrode of the fifth controllable switch. Even if the driving signal of the inverter is cut off, the fifth controllable switch still turns on. When the fifth controllable switch and the fourth controllable switch turn off, the voltage of the source electrode of the fourth controllable switch is equal to the voltage of the reference high level signal. When the fifth controllable switch and the fourth controllable switch turn on, the voltage of the source electrode of the fourth controllable switch reduces, thus, the power supply turns off. The above-mentioned function allows the comparing unit to avoid incorrect operation because of voltage fluctuation, thereby improving reliability of protecting the LED light bar.

Furthermore, the power supply receives an enable control signal that controls the power supply to turn on/off. A ground terminal of the LED backlight driving circuit receives the enable control signal through the sixth controllable switch. When the difference value of the first reference voltage subtracted from the feedback voltage is greater than the preset deviation value, the driving unit controls the sixth controllable switch to turn off. Generally, the power supply is controlled by the enable control signal where the enable control signal is sent by a main monitor of the LCD device. When the enable control signal is at a high level, the power supply normally works, and when the enable control signal is at a low level, the power supply stops working. Thus, in the present disclosure, the sixth controllable switch is connected in series between a guide line transmitting the enable control signal and a ground terminal of the LED backlight driving circuit. The short-circuit protection unit directly controls the sixth controllable switch to turn on, which forcedly reduces voltage of the enable control signal, thereby controlling the power supply to turn off.

A method for driving the LED backlit diving circuit, the LED backlight driving circuit comprises an LED light bar, and a power supply driving the LED light bar to light. The method comprises:

A: connecting a divider resistor in series with an output end of the LED light bars, and setting a first reference voltage and a preset deviation value. A first reference voltage is greater than or equal to voltage of two ends of the divider resistor corresponding to one normal LED light bar when brightness of the one normal LED light bar reaches a maximum; and B: regarding the voltage of two ends of the divider resistor as a feedback voltage, and comparing the feedback voltage with the first reference voltage; if a difference value of the first reference voltage subtracted from the feedback voltage is greeter than the preset deviation value, the power supply turns off.

An LCD device comprises the above-mentioned LED backlight driving circuit.

It should be understood that when one or more LED lamps of the LED light bar short-circuit, voltage of an entire LED light bars reduces; however, a typical LED backlight driving circuit misunderstands an insufficient output voltage of the power apply when the typical LED backlight driving circuit detects a voltage reduction of the entire LED light bar. Thus, the typical LED backlight driving circuit increases the output voltage of the power supply, which damages additional LED lamps. Thus, the present disclosure employs the divider resistor, which is connected in series with an output end of each of the LED light bars (in order to reduce power loss because of heat of the divider resistor, a resistance value of the divider resistor may be small, such as 1Ω). When brightness of one normal LED light bar reaches the maximum the voltage two ends of the divider resistor corresponding to the one normal LED light bar is regarded as the first reference voltage, and the short-circuit protection units collects the voltage of two ends of the divider resistor in real time, where the voltage collected is regarded as the feedback voltage. When the feedback voltage exceeds the first reference voltage, the LED light bar corresponding to the feedback voltage is determined to be short-circuited, and the diving unit of the short-circuit protection units controls the power supply to turn off, thereby protecting the LED light bar. In order to avoid to wrong turn off the power supply, the present deviation value is set, when the difference value of the first reference voltage subtracted from the feedback voltage is greater than the preset deviation value, the power supply turns off.

Wherein: 10. LED backlight driving circuit; 20. power supply; 30. LED light bar; 40. short-circuit protection unit; 41. comparing unit; 42 driving unit; 43. inverter; 50. constant current driving unit.

DETAILED DESCRIPTION

Figure 1:
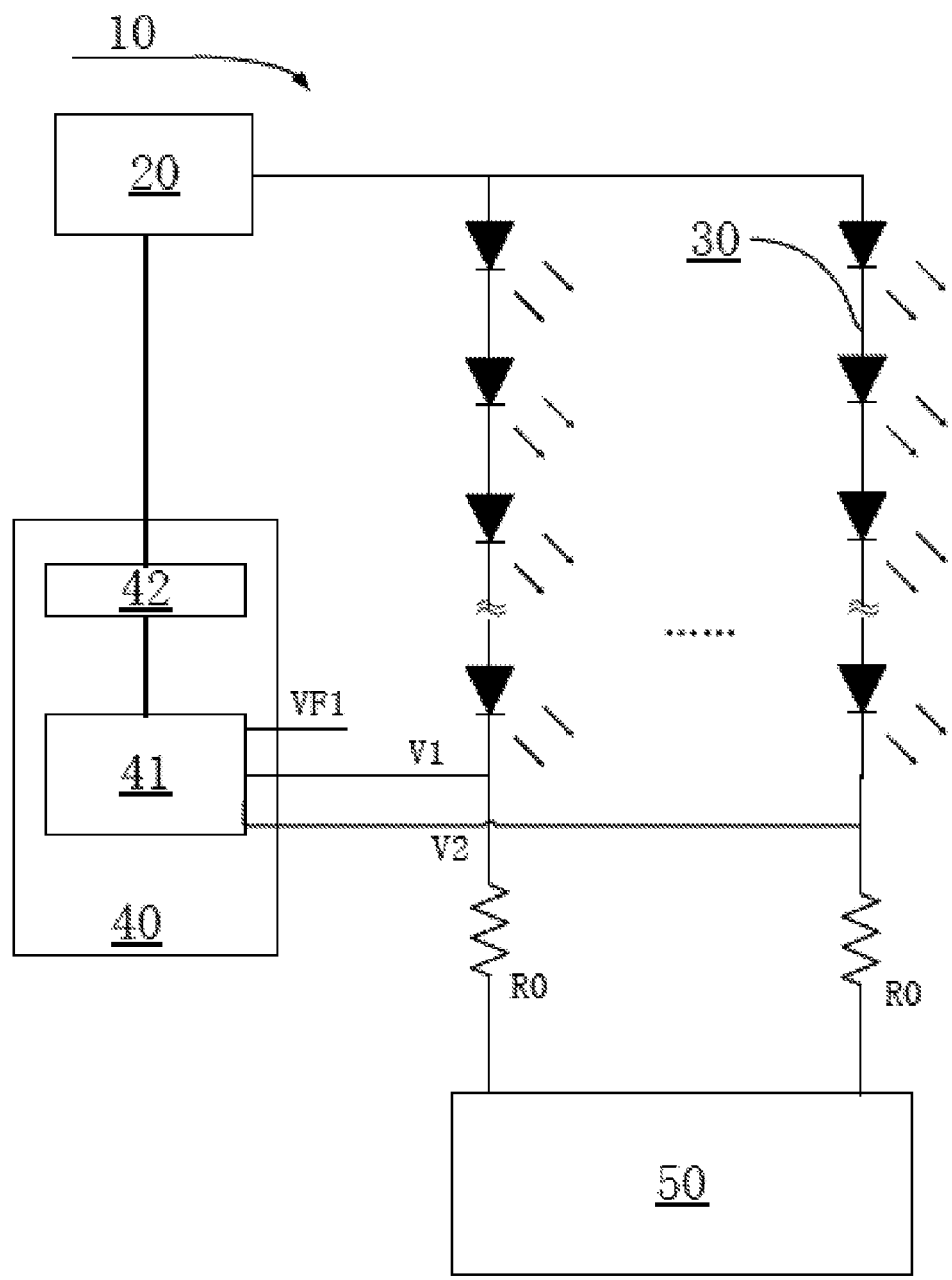
FIG. 1 is a schematic diagram of a light emitting diode (LED) backlight driving circuit of the present disclosure.

A liquid crystal display (LCD) device comprises a light emitting diode (LED) backlight driving circuit 10. As shown in FIG. 1, the LED backlight driving circuit 10 comprises a power supply 20, an LED light bar 30 coupled to the power supply 20, a short-circuit protection unit 40, a divider resistor R0, and a constant current driving unit 50. The LED light bar 30 is coupled to the constant current driving unit 50 through the divider resistor R0.

The short-circuit protection unit 40 comprises a comparing unit 41, and a driving unit 42 coupled to the comparing unit 41. Voltage of two ends of the divider resistor R0 is regarded as a feedback voltage (V1, V2), where the comparing unit 41 receives the feedback voltage. The comparing unit 41 also receives a preset first reference voltage VF1.

When a difference value of the first reference voltage VF1 subtracted from the feedback voltages is greater than a preset deviation value, the driving unit 42 controls the power supply 20 to turn off. When brightness of one normal LED light bar reaches a maximum, the first reference voltage VF1 is greater than or equal to the voltage of two ends of the divider resistor corresponding to the one normal LED light bar.

It should be understood that each of the LED light bars 30 may correspond to one short-circuit protection unit 40, the first reference voltage and the preset deviation value input to each of the short-circuit protection units 40 can be independently set. As long as one of the short-circuit protection units 40 is driven, the power supply 20 can turn off. In order to save cost, a plurality of LED light bars 30 only correspond to one short-circuit protection unit 40. When brightness of one normal LED light bar reaches the maximum, the voltage of two ends of the divider resistor corresponding to one normal LED light bar is regarded as the first reference voltage VF1. As long as the difference value of the first reference voltage subtracted from the voltage of two ends of the divider resistor R0 of any one LED light bar exceeds the preset deviation value the power supply 20 turns off.

The preset deviation value is a range of the difference value that the feedback voltage exceeds the first reference voltage VF1, which is determined according to different types of devices or program adjusting method. For example, the preset deviation value may be 1V, 2V, 3V or 5V, and when the difference value of the first reference voltage VF1 subtracted from the feedback voltage exceeds the preset deviation value (1V 2V, 3V, or 5V), the driving unit 42 controls the power supply 20 to turn off. The preset deviation value also may be zero, namely when the feedback voltage is greater than the first reference voltage VF1, the driving unit 42 controls the power supply 20 to turn off.

It should be understood that when one or more LED lamps of the LED light bar short-circuit, voltage of an entire LED light bar reduces; however, a typical LED backlight driving circuit misunderstands an insufficient output voltage of the power apply 20 when the typical LED backlight driving circuit detects a voltage reduction of the entire LED light bar. Thus, the typical LED backlight driving circuit increases the output voltage of the power supply 20, which damages additional LED lamps. Thus, the present disclosure employs the divider resistor R0, which is connected in series with an output end of each of the LED light bars (in order to reduce power loss because of heat of the divider resistor, a resistance value of the divider resistor R0 may be small, such as 1Ω). When brightness of one normal LED light bar reaches the maximum, the voltage of two ends of the divider resistor corresponding to the one normal LED light bar is regarded as the first reference voltage VF1, and the short-circuit protection units 40 collects the voltage of two ends of the divider resistor in real time, where the voltage collected is regarded as the feedback voltage. When the feedback voltage exceeds the first reference voltage VF1, the LED light bar corresponding to the feedback voltage is determined to be short-circuited, and then the driving unit 42 of the short-circuit protection units 40 controls the power supply 20 to turn off, thereby protecting the LED light bar 30. In order to avoid to wrong turn off the power supply, the preset deviation value is set, when the difference value of the first reference voltage VF1 subtracted from the feedback voltage is greater than the preset deviation value, the power supply 20 turns off.

The present disclosure is further described in detail in accordance with the figures and the exemplary examples.

Example 1

Figure 2:
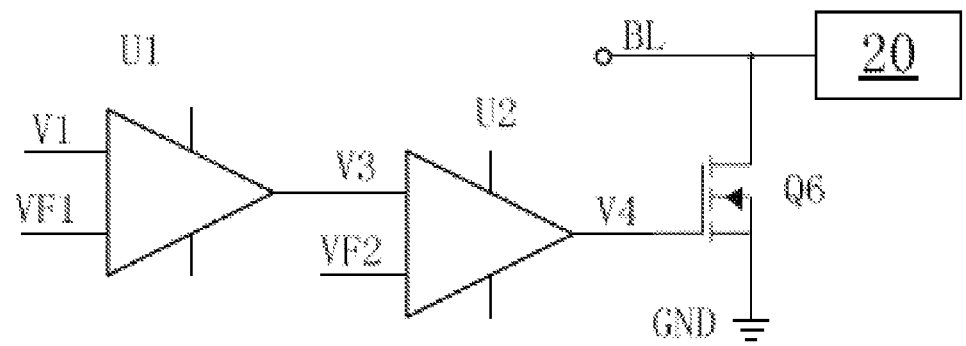
FIG. 2 is a schematic diagram of a short-circuit protection unit of a first example of the present disclosure.

As shown in FIG. 1 and FIG. 2, in a first example, the comparing unit 41 comprises a subtractor U1, where a first input end of the subtractor U1 receives the feedback voltage V1 and a second input end of the subtractor U1 receives the first reference voltage VF1. The difference value of the first reference data VF1 subtracted from the feedback voltage can be directly output by the subtractor U1, thus, the driving unit 42 only is used for determining whether the difference value exceeds the present deviation value, and if the difference value exceeds the present deviation value, the power supply 20 turns off.

The diving unit 42 comprises a comparator U2, where a first input end of the comparator U2 is coupled to an output end of the subtractor U1, a second input end of the comparator U2 receives a second reference voltage VF2. The second reference voltage is equal to the preset deviation value. When an output voltage of the subtractor U1 is greater than the second reference voltage VF2, the comparator U2 controls the power supply 20 to turn off.

Generally, the power supply 20 is controlled by an enable control signal BL, where the enable control signal BL is sent by a main monitor of the LCD device. When the enable control signal BL is at a high level (logic 1) the power supply normally works and when the enable control signal BL is at a low level (logic 0), the power supply stops working. Thus, in the present disclosure, a controllable switch (such as a sixth controllable switch Q6 in FIG. 2) is connected in series between a guide line transmitting the enable control signal BL and a ground terminal of the LED backlight diving circuit. The comparator U2 outputs a diving signal V4 to a control end of the sixth controllable switch Q6, when the output voltage V3 of the subtractor U1 is greater than the second reference voltage VF2, the comparator U2 controls the sixth controllable switch Q6 to turn on, which forcedly reduces voltage of the enable control signal BL, thereby controlling the power supply 20 to turn off.

The present disclosure determines whether the difference value is greater than the preset deviation value by the comparator U2 coupled to the subtractor U1, where the difference value is obtained by subtracting the first reference voltage VF1 from the feedback voltage. Additionally, output of the comparator U2 allows the comparator U2 to have good driving capability, which is completely able to drive the short-circuit protection when the LED lamps of the LED light bars short-circuit. Circuit structure of the first example is simple and component costs are low, which reduces design and production costs.

Example 2

Figure 3:
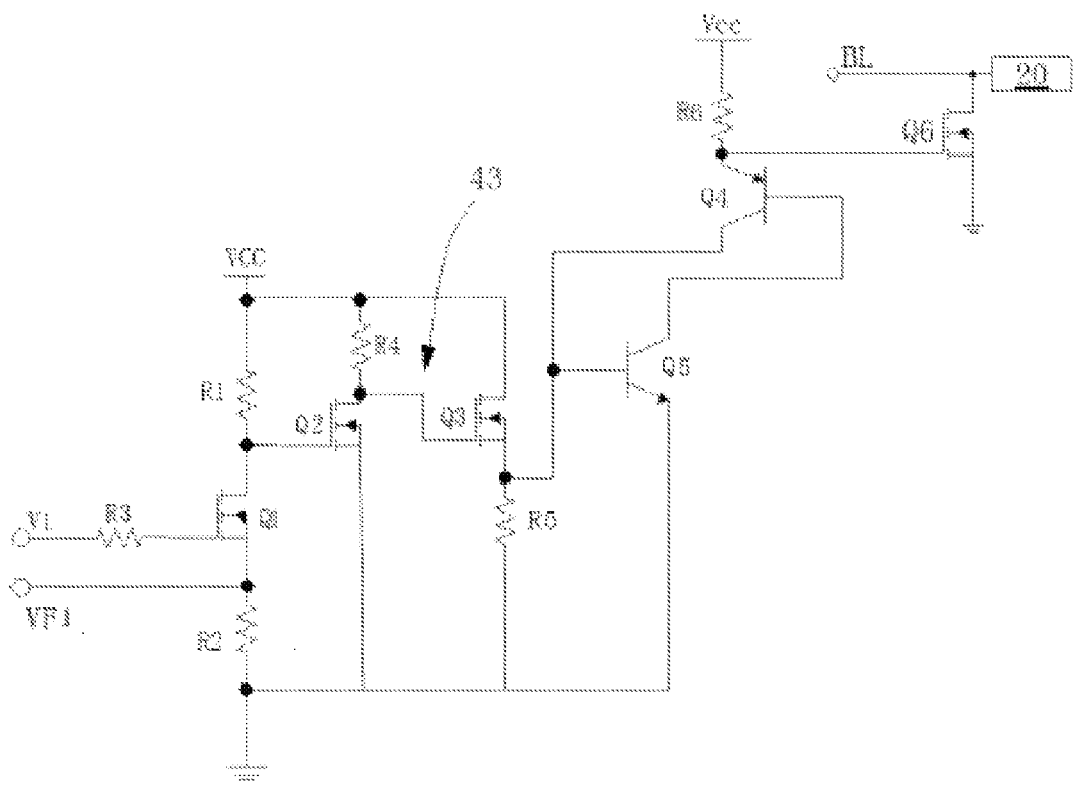
FIG. 3 is a schematic diagram of a short-circuit protection unit of a second example of the present disclosure.

As shown in FIG. 1 and FIG. 3, in a second example, the comparator unit 41 comprises a first controllable switch Q1, a first resistor R1, a second resistor R2, and a third resistor R3. A source electrode of the first controllable switch Q1 receives a reference high level signal VCC through the first resistor R1, a drain electrode of the first controllable switch Q1 is coupled to the ground terminal of the LED backlight driving circuit through the second resistor R2, and a gate electrode of the first controllable switch Q1 receives the feedback voltage V1 through the third resistor R3. The drain electrode of the first controllable switch Q1 receives the first reference voltage VF1, and the source electrode of the first controllable switch Q1 is coupled to an inverter 43, where an output end of the inverter 43 is coupled to the driving unit 42. The inverter 43 comprises a second controllable switch Q2, a third controllable switch Q3, a fourth resistor R4, and a fifth resistor R5.

A source electrode of the second controllable switch Q2 receives the reference high level signal VCC through the fourth resistor R4 and is coupled to a gate electrode of the third controllable switch Q3. A drain electrode of the second controllable switch Q2 is coupled to the ground terminal of the LED backlight driving circuit, and the gate electrode of the second controllable switch Q2 is coupled to the source electrode of the first controllable switch Q1. A source electrode of the third controllable switch Q3 receives the reference high level signal VCC, and a drain electrode of the third controllable switch Q3 is coupled to the ground terminal of the LED backlight driving circuit through the fifth resistor R5.

The driving unit comprises a sixth resistor R6, a fourth controllable switch Q4 that turns on at the low level, and a fifth controllable switch Q5 that turns on at the high level.

A source electrode of the fourth controllable switch Q4 receives the reference high level signal VCC through the sixth resistor R6, and a drain electrode of the fourth controllable switch Q4 is coupled to the drain electrode of the third controllable switch Q3 and a gate electrode of the fifth controllable switch Q5. A drain electrode of the fifth controllable switch Q5 is coupled to the ground terminal of the LED backlight driving circuit, and a source electrode of the fifth controllable switch Q5 is coupled to a gate electrode of the fourth controllable switch Q4. The source electrode of the fourth controllable switch Q4 outputs a driving voltage to control the power supply 20 to turn off.

When the first controllable switch Q1 turns on, the second controllable switch Q2 turns off, and the third controllable switch Q3 turns on, the reference high level signal VCC is input to a control end of the fifth controllable switch Q5 through the third controllable switch Q3, and the fifth controllable switch Q5 is driven to turn on. Correspondingly, voltage of the gate electrode of the fourth controllable switch Q4 reduces, the fourth controllable switch Q4 turns on, and an output voltage of the source electrode of the fourth controllable switch Q4 reduces, thus, the power supply 20 turns off.

Generally the power supply 20 is controlled by an enable control signal BL, where the enable control signal BL is sent by a main monitor of the LCD device. When the enable control signal BL is at the high level, the power supply normally works, and when the enable control signal BL is at the low level, the power supply stops working. Thus, in the present disclosure, a controllable switch (such as the sixth controllable switch Q6 in FIG. 3) is connected in series between the guide line transmitting the enable control signal BL and the ground terminal of the LED backlight driving circuit. The source electrode of the fourth controllable switch Q4 outputs a driving signal to the control end of the sixth controllable switch Q6. When the difference value of the first reference voltage VF subtracted from the feedback voltage is greater than the preset deviation value (namely threshold value of timing on the first controllable switch Q1), the fourth controllable switch Q4 controls the sixth controllable switch Q6 to turn on, which forcedly reduces voltage of the enable control signal BL, thereby controlling the power supply 20 to turn off.

In the second example, the first controllable switch Q1 is used as the comparing unit. A metal-oxide-semiconductor field-effect transistor (MOSFET) or a bipolar junction transistor (BJT) is used as a controllable switch, and the controllable switch is turned on when a value of voltage of the drain electrode of the controllable switch subtracted from voltage of the gate electrode of the controllable switch is greater than a threshold value, and the voltage of the gate electrode of the controllable switch reaches a desired value. Thus, condition for turning on the first controllable switch Q1 itself limits the preset deviation value. When the difference value of the first reference voltage VF1 subtracted from the feedback voltage is greater than the preset deviation value, the first controllable switch Q1 turns on. When the first controllable switch Q1 turns off, the voltage of the source electrode of the first controllable switch Q1 is equal to voltage of the reference high level signal VCC. After the first controllable switch Q1 turns on, the voltage of the source electrode of the first controllable switch Q1 reduces because the voltage is divided by the resistor. And the inverter is driven by changing the voltage of the source electrode of the first controllable switch Q1.

The second example provides the preset deviation value through the conditions for turning on the controllable switch, and the second example controls the inverter 43 by turning on/off the controllable switch, and further controls the diving unit. Circuit structure of the second example is simple and component costs are low. Because of the inverter 43, the first reference voltage VF1 cannot be directly input to the driving unit, thereby avoiding incorrectly operation.

The driving unit of the second example has self-locking function. When the short-circuit protection is driven, an extra signal is needed to cancel the protection. To be specific, after the fifth controllable switch Q5 turns on, voltage of the gate electrode of the fourth controllable switch Q4 correspondingly reduces, and the fourth controllable switch Q4 turns on, the reference high level signal VCC is input to the gate electrode of the fifth controllable switch Q5. Even if the driving signal of the inverter 43 is cut off, the fifth controllable switch Q5 still turns on. As long as the extra reset signal is sent to reduce the voltage of the gate electrode of the fifth controllable switch Q5, a work system formed by the fifth controllable switch Q5 and the fourth controllable switch Q4 can be turned off. When the fifth controllable switch Q5 and the fourth controllable switch Q4 turn off, the voltage of the source electrode of the fourth controllable switch Q4 is equal to the voltage of the reference high level signal VCC. When the fifth controllable switch Q5 and the fourth controllable switch Q4 turn on, the voltage of the source electrode of the fourth controllable switch Q4 reduces, thus, the power supply 20 turns off.

The second example uses the extra reset signal to cancel the protection operation, which allows the comparing unit to avoid incorrect operation because of voltage fluctuation, thereby improving reliability of protecting the LED light bar.

Example 3

Figure 4:
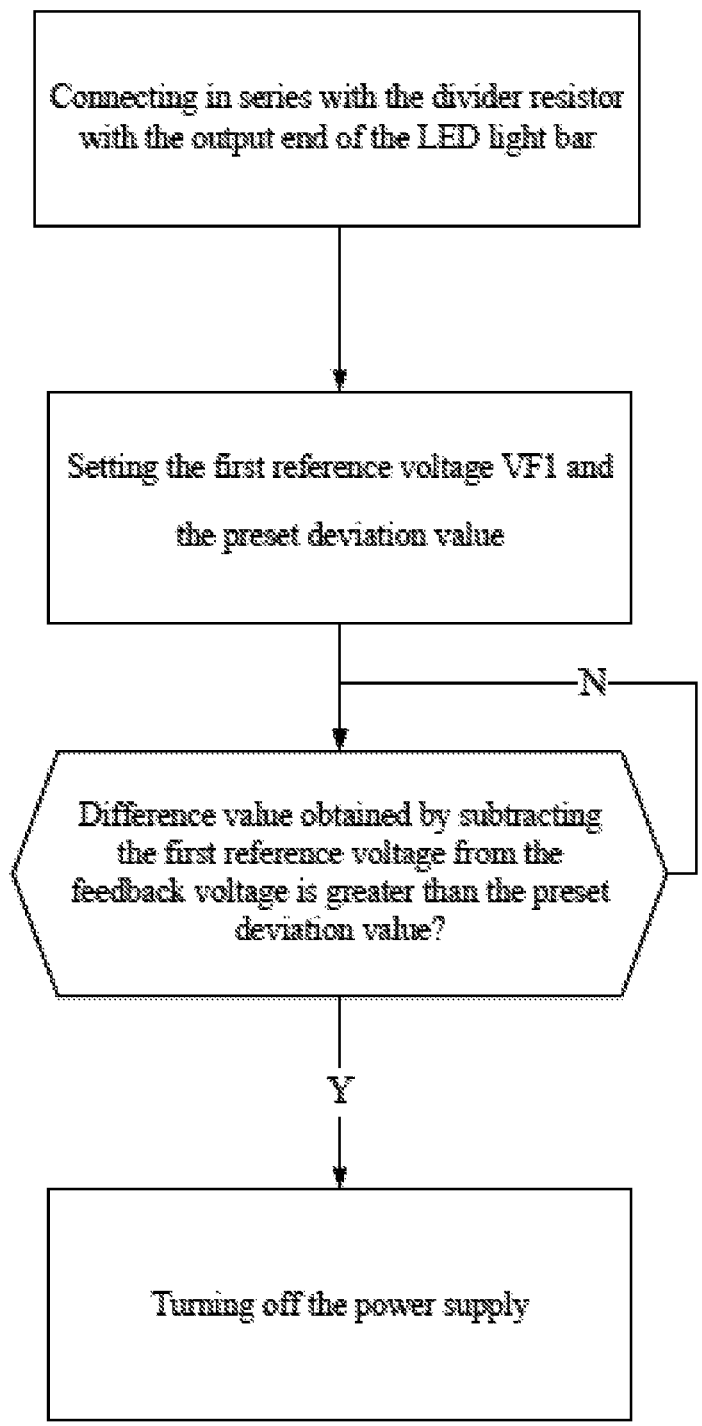
FIG. 4 is a flowchart of a method for driving an LED backlight driving circuit of a third example of the present disclosure.

As shown in FIG. 4, the LED backlight driving circuit comprises the LED light bar, and the power supply coupled to the LED light bar. A method for driving the LED backlight driving circuit comprises:

A: connecting the divider resistor R0 in series with the output end of the LED light bar, and presetting the first reference voltage VF1 and the deviation value; where the first reference voltage VF1 is greater than or equal to the voltage of two ends of the divider resistor corresponding to one normal LED light bar when brightness of the one normal LED light bar reaches the maximum; and B: regarding the voltage of two ends of the divider resistor as the feedback voltage, and comparing the feedback voltage with the first reference voltage VF1; if the difference value of the first reference voltage VF1 subtracted from the feedback voltage is greater than the deviation value, the power supply turns off.

The present disclosure is described in detail in accordance with the above contents with the specific exemplary examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A light emitting diode (LED) backlight driving circuit, comprising:
   an LED light bar;
   a power supply that drives the LED light bar to light;
   a short-circuit protection unit comprising a comparing unit and a driving unit coupled to the comparing unit; and
   a divider resistor;
   wherein an output end of the LED light bar is coupled to the short-circuit protection unit and the divider resistor, a voltage of one of two ends of the divider resistor is regarded as a feedback voltage, and the feedback voltage and a first reference voltage are input to the comparing unit;
   when a difference value of the first reference voltage subtracted from the feedback voltage is greater than a preset deviation value, the driving unit controls the power supply to turn off;
   when brightness of one normal LED light bars reaches a maximum, the first reference voltage is greater than or equal to voltage of two ends of the divider resistor corresponding to the one normal LED light bar;
   wherein the comparing unit comprises a subtractor, a first input end of the subtractor receives the feedback voltage, and a second input end of the subtractor receives the first reference voltage;
   wherein the driving unit comprises a comparator; a first input end of the comparator is coupled to an output end of the subtractor, and a second input end of the comparator receives a second reference voltage; the second reference voltage is equal to the preset deviation value; when an output voltage of the subtractor is greater than the second reference voltage, the comparator controls the power supply to turn off.

2. The LED backlight driving circuit of claim 1, further comprising a sixth controllable switch; wherein the power supply receives an enable control signal that controls the power supply to turn on/off; a ground terminal of the LED backlight driving circuit receives the enable control signal through the sixth controllable switch;
   when the difference value of the first reference voltage subtracted from the feedback voltage is greater than the preset deviation value, the driving unit of the short-circuit protection unit controls the sixth controllable switch to turn on.

3. The LED backlight driving circuit of claim 1, wherein the comparator unit comprises a first controllable switch, a first resistor, a second resistor, and a third resistor; a source electrode of the first controllable switch receives a reference high level signal through the first resistor, a drain electrode of the first controllable switch is connected with a ground terminal of the LED backlight driving circuit through the second resistor, and a gate electrode of the first controllable switch receives the feedback voltage through the third resistor;
   the drain electrode of the first controllable switch receives the first reference voltage; the source electrode of the first controllable switch is coupled to an inverter, and an output end of the inverter is coupled to the driving unit;
   when the first controllable switch turns on, an output voltage of the inverter inverts, which controls the driving unit to drive the power supply to turn off.

4. The LED backlight driving circuit of claim 3, further comprising a sixth controllable switch; wherein the power supply receives an enable control signal that controls the power supply to turn on/off; a ground terminal of the LED backlight driving circuit receives the enable control signal through the sixth controllable switch;
   wherein the difference value of the first reference voltage subtracted from the feedback voltage is greater than the preset deviation value, the driving unit of the short-circuit protection unit controls the sixth controllable switch to turn on.

5. The LED backlight driving circuit of claim 3, wherein the inverter comprises a second controllable switch, a third controllable switch, a fourth resistor, and a fifth resistor;
   wherein a source electrode of the second controllable switch receives the reference high level signal through the fourth resistor and is coupled to a gate electrode of the third controllable switch, a drain electrode of the second controllable switch is connected with the ground terminal of the LED backlight driving circuit, and the gate electrode of the second controllable switch is coupled to the source electrode of the first controllable switch;
   a source electrode of the third controllable switch receives the reference high level signal, and a drain electrode of the third controllable switch is connected with the ground terminal of the LED backlight driving circuit through the fifth resistor and is coupled to the driving unit.

6. The LED backlight driving circuit of claim 3, wherein the driving unit comprises a sixth resistor, a fourth controllable switch that turns on at a low level, and a fifth controllable switch that turns on at a high level;
   a source electrode of the fourth controllable switch receives the reference high level signal through the sixth resistor, a drain electrode of the fourth controllable switch is coupled to the output end of the inverter and a gate electrode of the fifth controllable switch; a drain electrode of the fifth controllable switch is connected with the ground terminal of the LED backlight driving circuit, and a source electrode of the fifth controllable switch is coupled to a gate electrode of the fourth controllable switch; the source electrode of the fourth controllable switch outputs a driving voltage to control the power supply to turn off.

7. The LED backlight driving circuit of claim 3, wherein the inverter comprises a second controllable switch, a third controllable switch, a fourth resistor, and a fifth resistor;
   a source electrode of the second controllable switch receives the reference high level signal through the fourth resistor and is coupled to a gate electrode of the third controllable switch; a drain electrode of the second controllable switch is connected with the ground terminal of the LED backlight driving circuit, and the gate electrode of the second controllable switch is coupled to the source electrode of the first controllable switch;
   a source electrode of the third controllable switch receives the reference high level signal, and a drain electrode of the third controllable switch is connected with the ground terminal of the LED backlight driving circuit through the fifth resistor;
   the driving unit comprises a sixth resistor, a fourth controllable switch that turns on at a low level, and a fifth controllable switch that turns on at a high level;
   a source electrode of the fourth controllable switch receives the reference high level signal through the sixth resistor; a drain electrode of the fourth controllable switch is coupled to the drain electrode of the third controllable switch and a gate electrode of the fifth controllable switch; a drain electrode of the fifth controllable switch is connected with the ground terminal of the LED backlight driving circuit, and a source electrode of the fifth controllable switch is coupled to a gate electrode of the fourth controllable switch; the source electrode of the fourth controllable switch outputs a driving voltage to control the power supply to turn off.

8. The LED backlight driving circuit of claim 7, further comprising a sixth controllable switch; wherein the power supply receives an enable control signal that controls the power supply to turn on/off; a ground terminal of the LED backlight driving circuit receives the enable control signal through the sixth controllable switch;
when the difference value of the first reference voltage subtracted from the feedback voltage is greater than the preset deviation value, the driving unit of the short-circuit protection unit controls the sixth controllable switch to turn on.

9. A light crystal display (LCD) device, comprising:
a light emitting diode (LED) backlight driving circuit;
wherein the LED backlight driving circuit comprises an LED light bar, a power supply that drives the LED light bar to light, a short-circuit protection unit, and a divider resistor;
an output end of the LED light bar is coupled to the short-circuit protection unit and the divider resistor; the short-circuit protection unit comprises a comparing unit and a driving unit coupled to the comparing unit; voltage of one of two ends of the divider resistor is regarded as a feedback voltage, and the feedback voltage and as first reference voltage are input to the comparing unit;
when a difference value of the first reference voltage subtracted from the feedback voltage is greater than a preset deviation value, the driving unit controls the power supply to turn off;
when brightness of one normal LED light bars reaches a maximum the first reference voltage is greater than or equal to voltage of two ends of the divider resistor corresponding to the one normal LED light bar;
wherein the comparing unit comprises a subtractor, a first input end of the subtractor receives the feedback voltage, and a second input end of the subtractor receives the first reference voltage; and
wherein the driving unit comprises a comparator; a first input end of the comparator is coupled to an output end of the subtractor and a second input end of the comparator receives a second reference voltage; the second reference voltage is equal to the preset deviation value, when an output voltage of the subtractor is greater than the second reference voltage, the comparator controls the power supply to turn off.

10. The LCD device of claim 9, further comprising a sixth controllable switch; wherein the power supply receives an enable control signal that controls the power supply to turn on/off; a ground terminal of the LED backlight driving circuit receives the enable control signal through the sixth controllable switch;
wherein the difference value of the first reference voltage subtracted from the feedback voltage is greater than the preset deviation value, the driving unit of the short-circuit protection unit controls the sixth controllable switch to turn on.

11. The LCD device of claim 9, wherein the comparator unit comprises a first controllable switch, a first resistor, a second resistor, and a third resistor; a source electrode of the first controllable switch receives a reference high level signal through the first resistor; a drain electrode of the first controllable switch is connected with a ground terminal of the LED backlight driving circuit through the second resistor, and a gate electrode of the first controllable switch receives the feedback voltage through the third resistor; the drain electrode of the first controllable switch receives the first reference voltage; the source electrode of the first controllable switch is coupled to an inverter, and an output end of the inverter is coupled to the driving unit;
when the first controllable switch turns on, an output voltage of the inverter inverts, which controls the driving unit to drive the power supply to turn off.

12. The LCD device of claim 11, wherein the inverter comprises a second controllable switch, a third controllable switch, a fourth resistor, and a fifth resistor;
wherein a source electrode of the second controllable switch receives the reference high level signal through the fourth resistor and is coupled to a gate electrode of the third controllable switch; a drain electrode of the second controllable switch is connected with the ground terminal of the LED backlight driving circuit, and the gate electrode of the second controllable switch is coupled to the source electrode of the first controllable switch;
a source electrode of the third controllable switch receives the reference high level signal, and a drain electrode of the third controllable switch is connected with the ground terminal of the LED backlight driving circuit through the fifth resistor and is coupled to the driving unit.

13. The LCD device of claim 11, wherein the driving unit comprises a sixth resistor, a fourth controllable switch that turns on at a low level, and a fifth controllable switch that turns on at a high level;
a source electrode of the fourth controllable switch receives the reference high level signal through the sixth resistor, a drain electrode of the fourth controllable switch is coupled to the output end of the inverter and a gate electrode of the fifth controllable switch; a drain electrode of the fifth controllable switch is connected with the ground terminal of the LED backlight driving circuit and a source electrode of the fifth controllable switch is coupled to a gate electrode of the fourth controllable switch; the source electrode of the fourth controllable switch outputs a driving voltage to control the power supply to turn off.

14. The LCD device of claim 11, wherein the inverter comprises a second controllable switch, a third controllable switch, a fourth resistor, and a fifth resistor;
a source electrode of the second controllable switch receives the reference high level signal through the fourth resistor and is coupled to a gate electrode of the third controllable switch; a drain electrode of the second controllable switch is connected with the ground terminal of the LED backlight driving circuit, and the gate electrode of the second controllable switch is coupled to the source electrode of the first controllable switch;
a source electrode of the third controllable switch receives the reference high level signal, and a drain electrode of the third controllable switch is connected with the ground terminal of the LED backlight driving circuit through the fifth resistor;
the driving unit comprises a sixth resistor, a fourth controllable switch that turns on at a low level, and a fifth controllable switch that turns on at a high level;
a source electrode of the fourth controllable switch receives the reference high level signal through the sixth resistor; a drain electrode of the fourth controllable switch is coupled to the drain electrode of the third controllable switch and a gate electrode of the fifth controllable switch; a drain electrode of the fifth controllable switch is connected with the ground terminal of the LED backlight driving circuit and a source electrode of the fifth controllable switch is coupled to a gate electrode of the fourth controllable switch; the source electrode of the fourth controllable switch outputs a driving voltage to control the power supply to turn off.

15. The LCD device of claim 14, further comprising a sixth controllable switch; wherein the power supply receives an enable control signal that controls the power supply to turn on/off; a ground terminal of the LED backlight driving circuit receives the enable control signal through the sixth controllable switch;

when the difference value of the first reference voltage subtracted from the feedback voltage is greater than the preset deviation value, the driving unit of the short-circuit protection unit controls the sixth controllable switch to turn on.

* * * * *